United States Patent Office 3,053,670
Patented Sept. 11, 1962

3,053,670
DENTAL IMPRESSION COMPOSITION
Elling Harald Nordin, En Tortiguet,
Villeneuve, Switzerland
No Drawing. Filed Feb. 20, 1961, Ser. No. 90,244
Claims priority, application Sweden Mar. 31, 1960
2 Claims. (Cl. 106—38.5)

For many years it has been known to use as impression compositions for dental purposes water-soluble salts of alginic acid which, by addition of metal salts, such as calcium sulfate, are converted into insoluble alginates thereby to form an elastic gel. The water-soluble alginate and the additions are usually sold in the form of a powder mixture. When this powder mixture is stirred with water a gel is formed. However, this gel formation can be delayed for one or a few minutes by certain additions so that there will be ample time to take an impression with the pulpy composition before solidification. In certain cases this composition shall have as high flexibility as possible and in other cases it shall be as hard as possible. An increased hardness can be obtained by addition of certain metal salts, such as lead silicate. If such hardness-increasing agents are added, this causes inconvenience inasmuch as the impression will be subjected to considerable shrinking when stored, it not being always suitable to make immediately a cast in the impression with plaster of Paris or the like. Even if such an impression is stored in an atmosphere with 100% relative humidity, a slowly proceeding shrinking is taking place which may amount to 1% or more already after 4–5 hours.

These drawbacks are eliminated according to the present invention according to which pulverized aluminium is added during the preparation of the alginate mixture with water.

Even extremely small amounts of pulverized aluminium (0.01%) give an obvious effect. In certain alginate impression compositions it is, however, advantageous to use up to 10% or more.

The invention is illustrated more in detail below reference being had to the following examples.

*Example 1*

20 g. of an alginate powder mixture intended for taking impressions and consisting of diatomaceous earth, alkali metal alignate, calcium sulfate, fluoride, zinc oxide, magnesium oxide, sodium tripolyphosphate and flavoring agents, were stirred with 45 ml. of water. The alginate reacts very fast with the calcium sulfate and a gel is formed. However, this reaction is to be delayed in order to make it possible to handle the composition for some minutes. This is obtained by the addition of the phosphate. The zink oxide and the magnesium oxide are added in order to impart to the gel an increased strength. Soluble or slightly soluble fluorides such as alkali fluorides are added to give a better surface to the plaster poured or cast into the impression. The diatomaceous earth serves as a filling agent. After 4 minutes the mixture had solidified into a gel. After 5 hours storing in a closed vessel with 100% relative humidity the contraction of the impression was measured. The shrinking amounted to 0.66%.

*Example 2*

0.04 g. of pulverized aluminium were added to an alginate powder mixture having the same composition as in Example 1, whereafter the mixture was stirred with 45 ml. of water. The solidified impression was stored in a closed vessel with 100% relatively humidity. After 5 hours the contraction was measured and amounted to 0.17%, thus many times less than according to Example 1. A further addition of pulverized aluminium can completely eliminate the shrinking.

By adding aluminium as volume stabilizer according to the invention it is thus possible to increase considerably the contents of the metal salts which are favourable for the hardness but increase the contraction without any shrinking taking place.

In an alginate powder mixture according to Example 1 a hardness of 5 is obtained measured according to a certain hardness test. If 7% lead silicate are added to this mixture, a much greater hardness is obtained, viz. 3.2 according to the same test. However, the shrinking does not become less than 0.99% after 5 hours. If, however, 0.6 g. of pulverized aluminium are added, the shrinking is completely eliminated but the hardness is maintained.

According to the present invention the manufacture of hard and also contraction-free alginate impressions is made possible by adding pulverized aluminium and lead silicate, for example.

A preferable embodiment of the present method consists in adding dosed portions, e.g. in the form of tablets, to the water in which the alginate powder is stirred. When merely pulverized aluminium is added impressions are obtained which are very flexible and not hard, which is an advantage in certain cases. If pulverized aluminium as well as lead silicate especially are added hard impressions are obtained, which is in certain cases desirable and of great advantage.

Having now described my invention, what I claim as new and desire to secure by letters patent is:

1. A method of preventing shrinking of impression compositions intended especially for dental purposes and produced by mixing an aqueous solution of an alginate and a metal salt which converts the alginate into insoluble form while forming an elastic gel, which comprises adding to the mixture also pulverized aluminium.

2. A method according to claim 1 in which lead silicate is also added to the mixture.

References Cited in the file of this patent
UNITED STATES PATENTS

| 2,824,811 | Erickson | Feb. 25, 1958 |
| 2,837,434 | Grumbine | June 3, 1958 |
| 2,871,095 | Hervert | Jan. 27, 1959 |
| 2,941,890 | Zanberg | June 21, 1960 |

FOREIGN PATENTS

| 561,197 | Great Britain | May 9, 1944 |